United States Patent
Abou Rjeily

(10) Patent No.: US 7,903,752 B2
(45) Date of Patent: Mar. 8, 2011

(54) MAXIMUM LIKELIHOOD DECODER FOR PULSE AND AMPLITUDE POSITION MODULATION MULTI-SOURCE SYSTEM

(75) Inventor: Chadi Abou Rjeily, Byblor (LB)

(73) Assignee: Commissariat A l'Energie Atomique, Paris (FR)

( * ) Notice: Subject to any disclaimer, the term of this patent is extended or adjusted under 35 U.S.C. 154(b) by 559 days.

(21) Appl. No.: 12/072,520

(22) Filed: Feb. 26, 2008

(65) Prior Publication Data
US 2008/0232455 A1    Sep. 25, 2008

(30) Foreign Application Priority Data
Feb. 27, 2007   (FR) .................................... 07 53532

(51) Int. Cl.
H04L 5/12 (2006.01)
H04L 23/02 (2006.01)

(52) U.S. Cl. ......... 375/262; 375/265; 375/264; 375/260; 375/341; 714/792; 714/755; 714/794; 714/795

(58) Field of Classification Search ............ 375/262, 375/265, 264, 260, 341; 714/792, 755, 794, 714/795
See application file for complete search history.

(56) References Cited

U.S. PATENT DOCUMENTS

| | | | | |
|---|---|---|---|---|
| 6,654,928 B1 * | 11/2003 | Terry et al. | ........ | 714/792 |
| 7,216,267 B2 * | 5/2007 | Santraine et al. | ........ | 714/709 |
| 7,424,063 B2 * | 9/2008 | Yee | ........ | 375/267 |
| 7,760,828 B2 * | 7/2010 | Visoz et al. | ........ | 375/350 |
| 7,783,962 B2 * | 8/2010 | Kwon et al. | ........ | 714/794 |
| 2005/0111592 A1 * | 5/2005 | Yee | ........ | 375/341 |
| 2005/0135498 A1 * | 6/2005 | Yee | ........ | 375/267 |
| 2006/0274836 A1 * | 12/2006 | Sampath et al. | ........ | 375/242 |
| 2007/0283210 A1 * | 12/2007 | Prasad et al. | ........ | 714/755 |

OTHER PUBLICATIONS

Abou-Rjeily, Chadi et al., "Space-Time Coding for Multiuser Ultra-Wideband Communications," Laboratory of Electronics and Information Technology (LETI), Atomic Energy Commission (CEA), Sep. 13, 2005, pp. 1-25.

Abou-Rjeily, Chadi et al., "MIMO UWB Communications Using Modified Hermite Pulses," The 17th Annual IEEE International Symposium on Personal, Indoor and Mobile Radio Communications (PIMRC'06), pp. 1-5.

Damen, Mohamed O. et al., "On Maximum-Likelihood Detection and the Search for the Closet Lattice Point," IEEE Transactions on Information Theory, vol. 29, No. 10, Oct. 2003, pp. 2389-2402.

Proakis, J.G. et al., "Digital Communications," 4th Edition, pp. 242-247.

Viterbo, Emanuele et al., "A Universal Lattice Code Decoder for Fading Channels," IEEE Transactions on Information Theory, vol. 45, No. 5, Jul. 1999, pp. 1639-1642.

* cited by examiner

*Primary Examiner* — Phuong Phu
(74) *Attorney, Agent, or Firm* — Nixon Peabody LLP

(57) ABSTRACT

The present invention concerns a sphere decoder for maximum likelihood receiver intended to receive M-PPM-M'-PAM symbols at M modulation positions and at M' amplitude levels from a plurality P of sources. The sphere decoder uses a Schnorr-Euchner type enumeration adapted to classify the points of a multidimensional PPM-PAM modulation.

9 Claims, 7 Drawing Sheets

MAXIMUM LIKELIHOOD DECODER FOR PULSE AND AMPLITUDE POSITION MODULATION MULTI-SOURCE SYSTEM

CROSS REFERENCE TO RELATED APPLICATIONS OR PRIORITY CLAIM

This application claims the benefit of a French Patent Application No. 07-53532, filed on Feb. 27, 2007, the disclosure of which is incorporated herein in its entirety by reference.

TECHNICAL FIELD

The present invention concerns the field of maximum likelihood decoding, more particularly for a multi-source system using a hybrid pulse and amplitude position modulation.

STATE OF THE PRIOR ART

Receivers using a criterion of maximum likelihood, also known as ML (Maximum Likelihood) receivers, are well known in the field of telecommunications to be optimal when the transmission channel is Gaussian. A description of these receivers is found for example in the work of J. G. Proakis entitled "Digital communications", $4^{th}$ edition, pages 242-247. Maximum likelihood receivers have in particular been envisaged in the field of mobile telecommunications. In order to eliminate MAI (multi access interference), a ML receiver capable of simultaneously decoding the symbols emitted by the different users on the transmission channel (multi-user ML receiver) may be used. It can be shown that the estimation of the symbols transmitted by these users according to the criterion of maximum likelihood comes down to searching among the points of a network that which is the nearest to a point representative of the signal received in a space of dimension $M^K$ where M is the dimensionality of the modulation used by the K users. The network of points is generated by the modulation constellations of the different users. This method rapidly turns out to be complex for high K, so conventionally one resorts to a decoding known as "sphere decoding", which limits the search for the closest neighbour to the points of the network belonging to a noise sphere centred on the received point. A description of the sphere decoder may be found in the article of E. Viterbo et al. entitled "A universal lattice code decoder for fading channels" published in IEEE Transactions on Information Theory, vol. 45, pages 1639-1642, July 1999. Sphere decoding has been applied to systems using PAM or QAM type modulation constellations.

More recently, sphere decoding has been proposed for implementing MIMO (Multiple Input Multiple Output) system receivers. MIMO system is taken to mean a telecommunication system in which at least one emitter transmits information symbols by means of a plurality of antenna. The receiver may have a single antenna (MISO system, acronym of Multiple Input Single Output, is then more specifically used) or a plurality of antenna, the term MIMO being chosen here to designate indiscriminately these two configurations.

In the case of a MIMO system, the network of points is generated by the modulation constellations used to transmit the symbols by the different antenna. An example of embodiment of sphere decoding for MIMO system is found in the article of M. O. Damen et al. entitled "On Maximum-Likelihood detection and the search for the closest lattice point" published in IEEE Trans. on Information Theory, Vol. 49, N° 10, October 2003, pages 2389-2402. In this sphere decoder, only PAM and QAM modulations are envisaged.

In the following description, the generic term multi-source designates equally well a multi-user configuration as a MIMO configuration. It will be understood that in the first case the sources represent the flow of symbols from or to the different users and, in the second case, the flow of symbols emitted by the different antennas. Obviously, these two cases may be combined when the terminals of the users are of multi-antenna type. Moreover, it will be assumed that the flow of symbols is synchronous.

The sphere decoding ML receiver will be described in the case of K users, each user $k \in \{1, \ldots, K\}$ transmitting by means of $i_k$ antenna to the receiver, i.e. a total number of $$P = \sum_{k=1}^{K} i_k$$

sources. The signal received may be expressed in the vectorial form:

$$x = Ha + n \quad (1)$$

where:

x is a vector of decision variables of dimension P' where P' is equal to the product of the number of antenna of the receiver with the number of decision variables observed per receiving antenna, for example the number of paths resolved per antenna.

a is a vector of size PM, obtained by the concatenation of vectors $a^{(1)}, a^{(2)}, \ldots, a^{(P)}$, each vector $a^{(p)}$, $p \in \{1, \ldots, P\}$ being the vectorial representation of the information symbol transmitted by the $p^{th}$ source and being of dimension M equal to the dimensionality of the modulation used;

H is the matrix of size P'×PM representing the transmission channel, it describes in particular the interferences between users and between paths from the different antenna;

n is a vector of dimension P', the components of which are samples of centred additive Gaussian white noise affecting the signal received.

The maximum likelihood receiver estimates the vector a minimising the quadratic deviation $\|x - Ha\|^2$ with the vector received, i.e.:

$$\hat{a} = \underset{a \in C^P}{\operatorname{argmin}} \|x - Ha\|^2 \quad (2)$$

where $C^P$ is the product constellation from the respective constellations of P sources.

It can be shown that the expression (2) can be written in an equivalent manner:

$$\hat{a} = \underset{a \in C^P}{\operatorname{argmin}} \|z - Ra\|^2 \quad (3)$$

with $z = Q^T x$ and
where Q and R are respectively a unit matrix of size P'×P and an upper triangular matrix of size P×P obtained by QR decomposition of the matrix H, in other words $R^T R = H^T H$.

For PAM or QAM constellations, it is still possible, by means of an elementary linear operation l, that we will later disregard, to end up with the case where the points of the constellation produced are elements of $Z^{MP}$ where Z is all of the relative integers and M the dimensionality of the modulation constellations. The vectors Ra may then be represented as the points of a network $\Lambda$ of generating matrix R.

Sphere decoding consists in carrying out a search of the closest neighbour within a sphere (in a space of dimension MP) centred on the point representative of the signal received z. The search is carried out among the points of $\Lambda$ included within this sphere.

The manner in which the candidates are successively selected (or enumerated) is critical for the performance of the decoding algorithm. Essentially two enumeration techniques are known, the first known as Pohst, the second known as Schnorr-Euchner.

A sphere decoding using a Pohst enumeration will firstly be described.

It is assumed for the needs of illustration that the modulation is of PAM type, in other words that the space considered is of dimension P. It also applies to a QAM modulation, the dimension of the space then being 2P.

The search is carried out, dimension by dimension, or according to the usual terminology, layer by layer, by selecting in each layer the coordinate of a candidate point of $\Lambda$.

The contribution of the layer P to the quadratic distance (3) is simply equal to:

$$(z_P - r_{P,P} a_P) \quad (4)$$

In the same way, the contribution of the layer P−1 to this quadratic distance is expressed by:

$$(z_P - r_{P-1,P-1} a_{P-1,P} a_P)^2 \quad (5)$$

and, generally speaking, the contribution of the layer is expressed by:

$$(z_i - r_{i,i} a_i - E_i) \quad (6)$$

with $E_i$ defined by $$E_i = \sum_{j=i+1}^{P} r_{i,j} a_j.$$

If $T_i$ designates the contribution of the successive layers $i+1, \ldots, P$, this may be obtained by descending recurrence:

$$T_{i-1} = T_i + |z_i - E_i - r_{i,i} a_i|^2 \quad (7)$$

with $T_P = 0$.

With the previous conventions, the search in the sphere of quadratic radius d comes down to determining for each of the layers the values $a_i$ of Z confirming:

$$(z_i - r_{i,i} a_i - E_i)^2 + T_i \leq d \text{ for } i = P, \ldots, 1 \quad (8)$$

or, in an equivalent manner:

$$\frac{z_i - E_i - \sqrt{d - T_i}}{r_{i,i}} \leq a_i \leq \frac{z_i - E_i + \sqrt{d - T_i}}{r_{i,i}} \quad (9)$$

Finally, if the PAM constellation is around M' where M' is a power of 2 and if the above mentioned linear transformation is $l(m') = 2m' - 1 - M'$ for $m' \in \{1, \ldots, M'\}$, the search may be reduced to the uneven integers belonging to the interval $[A_i, B_i]$ where:

$$A_i = \max\left(1 - M', \left\lceil \frac{z_i - E_i - \sqrt{d - T_i}}{r_{i,i}} \right\rceil \right) \text{ and} \quad (10)$$

$$B_i = \min\left(M' - 1, \left\lfloor \frac{z_i - E_i + \sqrt{d - T_i}}{r_{i,i}} \right\rfloor \right)$$

where $\lceil x \rceil$ is the smallest integer greater than x and $\lfloor x \rfloor$ is the biggest integer less than x.

This reduction in the search interval corresponds in fact to an intersection of the interval as defined in (9), with the projection of the constellation onto the dimension in question.

An interval of validity is thereby defined for each layer. It gives the maximal admissible excursion in this layer, considering the choice already made for the values $a_j$ in the upper layers.

FIG. 1 represents the principle of the sphere decoder in the simple case where P=2 and M'=4. The sphere is centred on the point z represented by a cross. The points of the constellation produced $C^2$ are represented by full circles. The interval of validity $[A_2, B_2]$ of layer 2 is none other than the intersection of the projection of the sphere with that of the constellation, here $[A_2, B_2] = [-3, 3]$. The interval of validity $[A_1, B_1]$ is then determined by the choice of a value $a_2$ in $[A_2, B_2]$. It may thereby be seen in the example illustrated that for $a_2 = 1$, the interval of validity is $[A_1, B_2] = [-3, 1]$.

FIG. 2 represents a flow diagram of the sphere decoding method using a Pohst enumeration.

At step 210, the initialisation of the layer index, intermediate variables and search radius of the sphere are carried out, i.e.: i=P; $T_P = 0$; $E_P = 0$; d=D where D is the initial quadratic radius of the search sphere. D is chosen as a function of an estimation of the noise power.

At step 220, one tests if $T_i > d$, in other words if the interval is reduced to the empty assembly. If this is the case, one tests in 223 if i=P and in the affirmative the algorithm ends in 225. In the negative, one increments i by 1 and one moves on to step 230.

If $T_i \leq d$, one calculates in 230 the bounds $A_i$ and $B_i$ according to (10) and one initialises $a_i$ by $a_i = A_i - 2$.

At step 240, one increments $a_i$ by 2 and one tests in 250 whether the corresponding point is still in the interval, i.e. $a_i \leq B_i$. In the negative, one returns to the test 223 and in the affirmative one tests in 260 if i=1. If this is not the case, one moves on to step 263 in which i is decremented by 1 and the new values $E_{i-1}$ and $T_{i-1}$ are calculated. On the other hand, if one has reached the lowest layer, i=1, one adds in 270 the contribution of this latter layer to obtain the distance of the candidate selected to the point z, i.e. $\hat{d} = T_1 + |z_1 - E_1 - r_{1,1} a_1|^2$. One compares in 280 this distance to the quadratic current radius d. If it is lower, the radius of the sphere is reduced as a consequence d=d and one updates the best candidate â=a. In all cases one then returns to step 240.

The algorithm described above carries out a search by scanning the intervals of validity layer by layer from their lower bounds towards their upper bounds, the fastest scanning being carried out in the highest layer (i=P) and slowest in the lowest layer (i=1). At each selection of a new candidate coordinate in a layer, the bounds of the intervals of validity of the upper layers are recalculated. Moreover, as soon as one improves the distance to the received point, one updates the radius of the sphere, which enables the search to be accelerated. Finally, the output vector of the algorithm is the point of the constellation produced the closest to the received point z.

Sphere decoding using the Pohst enumeration is quite slow on account of the systematic scanning of the intervals of validity from their lower bounds.

Sphere decoding using the Schnorr-Euchner enumeration is substantially faster than the previous decoding. It is based on the principle that it is more efficient to carry out a search from a point ê of the product constellation corresponding to a first estimation of the signal transmitted. More precisely, this point is obtained by means of a ZF-DFE type equalisation: one subtracts the interference due to a layer (a user) from the following (lower) layers, the decision at each layer being taken by the sphere decoder.

I.e., by beginning with the layer P:

$$\hat{e}_i = \text{round}(e_i) \text{ with} \quad (11)$$
$$e_P = z_P/r_{P,P}$$
$$e_i = (z_i - \xi_i)/r_{ii} \text{ and } \xi_i = \sum_{j=i+1}^{P} r_{i,j}\hat{e}_j \text{ for } i = P-1, \ldots, 1$$

where round(y) represents the odd relative integer (with the previous form of linear transformation 1) the closest to y.

Each layer i contributes to the quadratic distance from the point a of the network to the received point z for $d_i = r_{ii}(a_i - e_i)^2$.

The search for the closest neighbour is carried out in each layer i by considering successively the coordinates $\hat{e}_i$, $\hat{e}_i + 2\delta_i$, $\hat{e}_i - 2\epsilon_i$, $\hat{e}_i + 4\epsilon_i$, $\hat{e}_i - 4\delta_i$, etc. where $\delta_i = \text{sgn}(e_i - \hat{e}_i)$. It will be understood that one thereby starts from $\hat{e}_i$ and that one progresses in zigzag on either side of this estimation while at the same time being sure to remain within the interval of validity.

FIG. 3 represents a flow diagram of the sphere decoding method using a Schnorr-Euchner enumeration.

At step 310, one initialises the layer index, the intermediate variables and the search radius of the sphere, i.e.: i=P; $\xi_P$=0; $T_P$=0; d=D where D is the initial quadratic radius of the search sphere.

At step 320, one carries out the ZF-DFE equalisation: $\hat{e}_i = \text{round}(e_i)$ with $e_i = (z_i - \xi_i)/r_{ii}$, and one determines the initial coordinate value $a_i = \hat{e}_i$ as well as the initial search direction: $\delta_i = \text{sgn}(e_i - \hat{e}_i)$.

At step 330, one tests if the point is in the sphere, in other words if $T_i + r_{ii}(a_i - e_i)^2 < d$. In the negative, one moves on to step 350. In the affirmative, one verifies in 340 that it is indeed in the constellation in other words that $|a_i| \leq M'-1$. If this is not the case one moves on to step 380.

If the candidate $a_i$ is in the interval of validity (projection of the intersection of the sphere and the constellation), one tests in 345 if one has reached the lowest layer, i=1. If this is the case, one continues in 360.

If not, one updates in 347 the intermediate variables:

$$\xi_{i-1} = \sum_{j=i}^{P} r_{i-1,j} a_j,$$

$T_{i-1} = T_i + r_{ii}(a_i - e_i)^2$ and one decrements i by 1. One then returns to step 320.

One tests in 350 if i=P. If this is the case, the algorithm ends in 355, if not, one moves on to step 370 to increment i by 1.

At step 345, if i=1, one has reached the lowest layer and therefore a candidate point has been found. One adds the contribution of this layer to obtain the distance of the candidate selected to the point z, i.e. $\hat{d} = T_1 + r_{11}^2(a_1 - e_1)^2$. One compares in 360 this distance to the current quadratic radius d. If it is lower than d, one updates the distance d=$\hat{d}$ and the closest neighbour â=a in 365. In all cases, one goes through 370 to increment i by 1.

Finally, at step 380, one updates $a_i$ by $a_i = a_i + \delta_i$ with $\delta_i = -\delta_i - 2\text{sgn}(\delta_i)$ and one returns to step 330.

FIGS. 4A and 4B schematically represent the scanning of points according to the Pohst enumeration and that of Schnorr-Euchner, respectively. It has been assumed that the constellation was 4-PAM and that the number of sources P was 3. The different lines correspond to the projections according to the P=3 dimensions. One has represented by crosses the components of z and by circles the points of PAM modulation constellations. In both cases, the branches successively covered by the algorithm have been indicated by (1), (2) etc.

While sphere decoding has been the subject of numerous studies for PAM and QAM modulations, it has only been envisaged recently for PPM (Pulse Position Modulation) modulations. A sphere decoding for this type of modulation has been proposed for a pulsed type UWB MIMO system in the article of C. Abou-Rjeily et al. entitled "MIMO UWB communications using modified Hermite pulses", published in Proc. of the 17th Annual IEEE Internal Symposium on Personal, Indoor and Mobile Communications (PIRMC'06). It will be recalled that a pulsed UWB system is a system using the transmission in base band of very brief pulse frames (of the order of several picoseconds). The symbols transmitted belong to a modulation alphabet M-PPM, or in a more general manner to a hybrid modulation M-PPM-M'-PAM. The cardinal of the modulation alphabet is MM'. For each of the M temporal positions, M' modulation amplitudes are possible. A symbol a of this alphabet may be represented by a sequence $a_m$, m=0, ..., M-1 with $a_m = \delta(m-\mu)\alpha$ where $\mu$ is a position of the modulation M-PPM, $\alpha$ an amplitude of the PAM modulation and $\delta(.)$ the Dirac symbol. Each PPM or PPM-PAM symbol modulates the temporal positions and, if necessary, the temporal positions and the amplitudes of the elementary pulses of a frame.

One may consider a symbol M-PPM (resp. M-PPM-M'-PAM) as a vector of dimension M, of which only one of the components is equal to 1 (resp. $\alpha$) and the others are zero. Unlike a QAM modulation, the components of a PPM or PPM-PAM symbol are therefore not independent.

If it is assumed that P sources transmit PPM symbols, the space of the signals to be considered is of dimension MP. In this space, each source is represented by a layer, itself composed of M temporal positions (or sub-layers) of a PPM or PPM-PAM symbol.

The sphere decoding described in the above mentioned article proposes treating in a joint manner M consecutive layers on account of their interdependency.

The relation (8) is then replaced by a constraint linking M successive sub-layers, i.e. for the layer of order p:

$$\sum_{m=1}^{M} \left| z_m^{(p)} - \sum_{j=f(p,m)}^{PM} r_{f(p,m),j} a_j \right|^2 \leq d - T_p \quad (12)$$

where:

$z^{(p)}$ is a sub vector of z, representative of the signal received, in other words the vector z is formed by concatenation of P vectors $z^{(1)}, \ldots, z^{(P)}$ each corresponding to a source, $z_m^{(p)}$ being the $m^{th}$ component of the PPM or PPM-PAM symbol emitted by this source;

the function $f$ is given by $f(p,m)=(p-1)M+m$;

$T_p$ is the sum of the contributions to the quadratic distance of the layers p+1, ..., P.

Given that, for each source p, the transmission only takes place for a single position $c(p) \in \{1, \ldots, M\}$, the expression (12) may be rewritten in the form:

$$\sum_{m=1}^{M} |z_m^{(p)} - r_{f(p,m),f(p,c(p))} a_{f(p,c(p))} - E'_{p,m}|^2 \leq d - T_p \quad (13)$$

with $$E'_{p,m} = \sum_{j=f(p+1,1)}^{PM} r_{f(p,m),j} a_j,$$

or instead in the more compact form:

$$\|z^{(p)} - a_{c(p)}^{(p)} R_{.,c(p)}^{(p,p)} - E_{.,p}\|^2 \leq d - T_p \quad (14)$$

where the vector a, like the vector z, is a concatenation of P vectors $a^{(1)}, a^{(2)}, \ldots, a^{(P)}$, the vector a(P) being of components $a_m^{(p)} = a_{f(p,m)}$, m=1, ..., M;

$R^{(i,j)}$ is a sub-matrix M×M of R constituted of the elements $r_{m,m'}$ with m=(i−1)M+1, ..., iM and m'=(j−1)M+1, ..., jM;

for a given matrix Ω, $Ω_{.,k}$ conventionally designates the $k^{th}$ column of this matrix;

$E_{.,p}$ is the $p^{th}$ column of a matrix E and is defined by $$E_{.,p} = \sum_{p'=p+1,1}^{P} a_{c(p')}^{(p')} R_{.,c(p')}^{(p,p')}.$$

It will be understood from the expression (14) that the M sub-layers corresponding to the source p are treated jointly. In particular, the bounds of the intervals of validity of each of the components $a_m^{(p)}$ m=1, ..., M are determined at the same time. These bounds depend on the candidates $a^{(p+1)}, \ldots a^{(P)}$ already chosen for the upper layers.

The enumeration technique used in this sphere decoding may be considered as an extension of a Pohst enumeration. The temporal positions of each layer are scanned one by one, from their lower bounds, taking the precaution of only selecting one position per layer. The convergence of the decoding is therefore relatively slow.

Furthermore, the direct application of a Schnorr-Euchner type enumeration technique is far from being trivial since the sub-layers, in other words the PPM positions of a same layer, are not independent.

The aim of the present invention is to propose a sphere decoding method for a plurality of sources using a hybrid PPM-PAM modulation, which converges more rapidly than that known from the prior art.

DESCRIPTION OF THE INVENTION

The present invention is defined by a sphere decoding method for maximum likelihood receiver intended to receive PPM-PAM symbols from a plurality P of sources, each source emitting a flow of PPM-PAM symbols at M positions and at M' modulation amplitudes, P PPM-PAM symbols emitted simultaneously by the P sources being represented by a point of the modulation product constellation in a space of signals transmitted of dimension MP decomposed into P layers, each layer representing the M possible modulation positions and in each of these positions the M' possible amplitudes of a PPM-PAM symbol emitted by this source, the signal received by said receiver being transformed into a point representative of this signal, referred to as the received point, in the space of the signals transmitted, said method determining the point of the constellation produced the closest to the received point within a sphere of given quadratic radius. According to said method, for each layer of rank p:

(a) one performs a ZF-DFE equalisation of the signal received in said layer considering the PPM-PAM symbols estimated in the P-p previous layers, referred to as layers higher than the layer p;

(b) a PPM-PAM symbol of this layer is selected:

(b1) by listing, for each PPM position of said layer, the list of PAM symbols in this position, as a function of the contributions that they would make to the quadratic distance to the received point and by retaining for each list the PAM symbol making the lowest contribution, referred to as list champion;

(b2) by selecting the PPM position making the lowest contribution and by selecting as PPM-PAM symbol the list champion in the position thereby determined;

(c) this contribution is added to those obtained for the previous layers to obtain a sum of contributions;

the steps (a), (b), (c) being repeated until the lowest layer is attained; and one updates the quadratic radius of the sphere and said nearest point if said sum of contributions is lower than the quadratic radius of the sphere.

Within the step (b), the step (b2) is advantageously followed by a step (b3) in which one chooses as new champion of the list relative to the position selected the following PAM symbol of this list.

If, for a given layer and a PPM-PAM symbol selected in this layer, said sum of contributions exceeds the quadratic radius of the sphere, one passes on to the upper layer and one selects a new PPM-PAM symbol in this layer according to step (b).

If all the symbols of said upper layer have already been the subject of a selection, one passes on to the yet upper layer to select there a new PPM-PAM symbol according to step (b).

If one has reached the highest layer and that, either one has selected all the PPM-PAM symbols of said layer, or the contribution of said layer calculated for the symbol selected exceeds the quadratic radius of the sphere, the decoding method ends by said closest point.

According to one embodiment, the PPM-PAM symbols of the respective sources of ranks 1, . . . , P, estimated in the sense of maximum likelihood, are obtained as sub-vectors of M components of the vector of MP components representing said closest point.

The invention is further defined by a maximum likelihood receiver intended to receive PPM-PAM symbols from a plurality P of sources, comprising a filter matched to the transmission channel between the sources and the receiver and, if necessary, the spatial-temporal coding used in the emission, the receiver moreover comprising a sphere decoder comprising means adapted to perform the steps of the sphere decoding method according to one of the previous claims, the sphere decoder receiving in input the output of said matched filter.

BRIEF DESCRIPTION OF DRAWINGS

Other characteristics and advantages of the invention will become clear on reading a preferred embodiment of the invention and by referring to the appended figures, among which.

DETAILED DESCRIPTION OF SPECIFIC EMBODIMENTS

Figure 1:
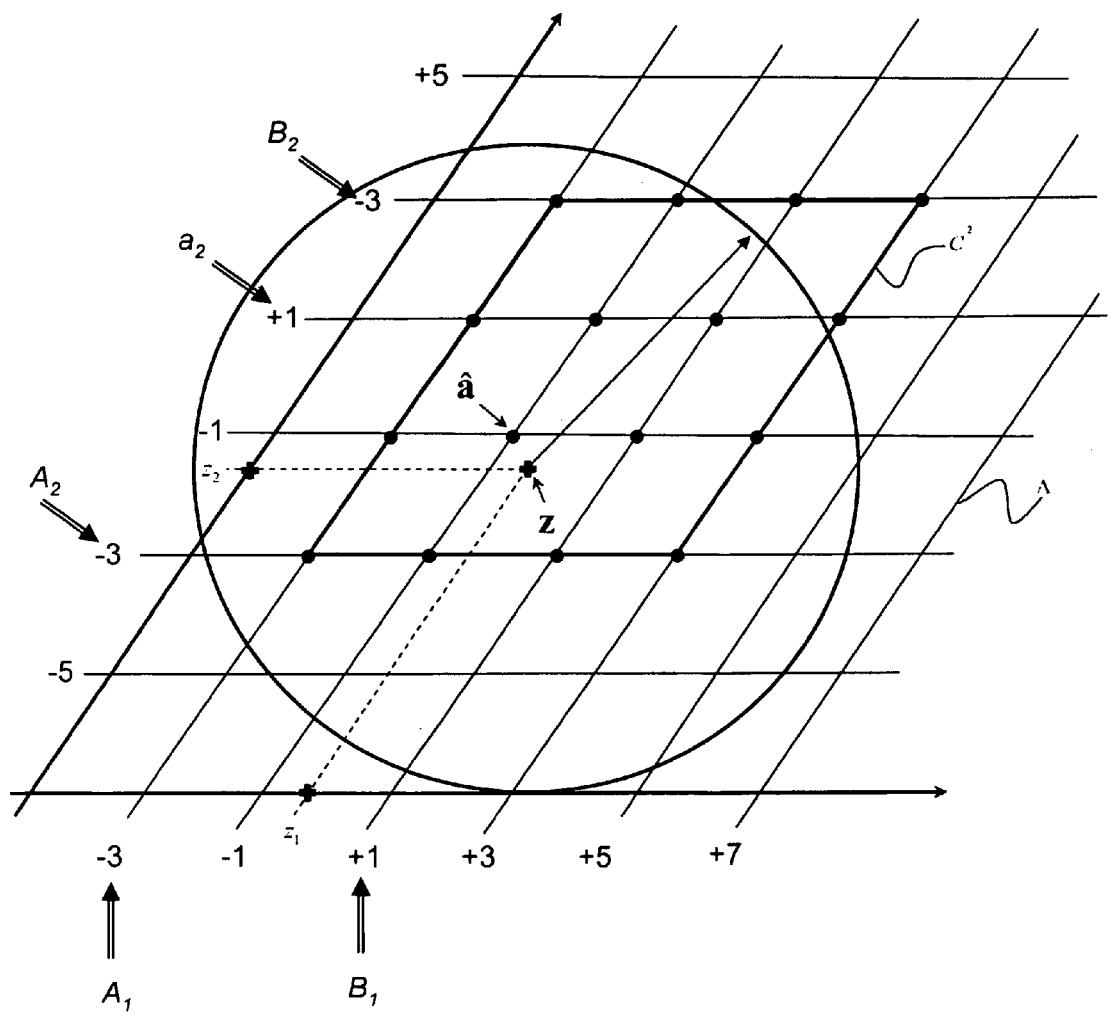
FIG. 1 illustrates the principle of a sphere decoding for a system with two PAM sources.
Figure 2:
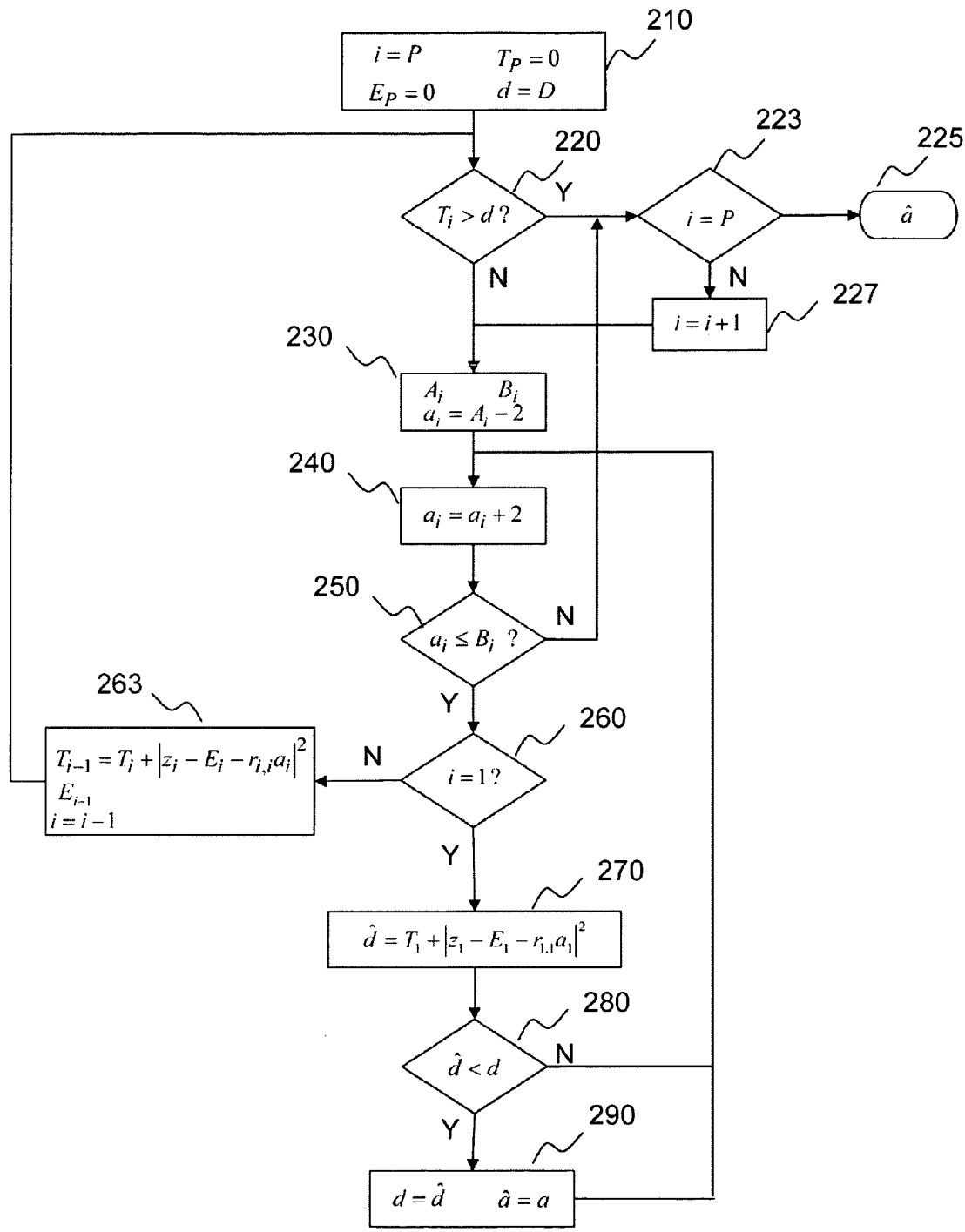
FIG. 2 represents the flow diagram of a first sphere decoding algorithm known from the prior art.
Figure 3:
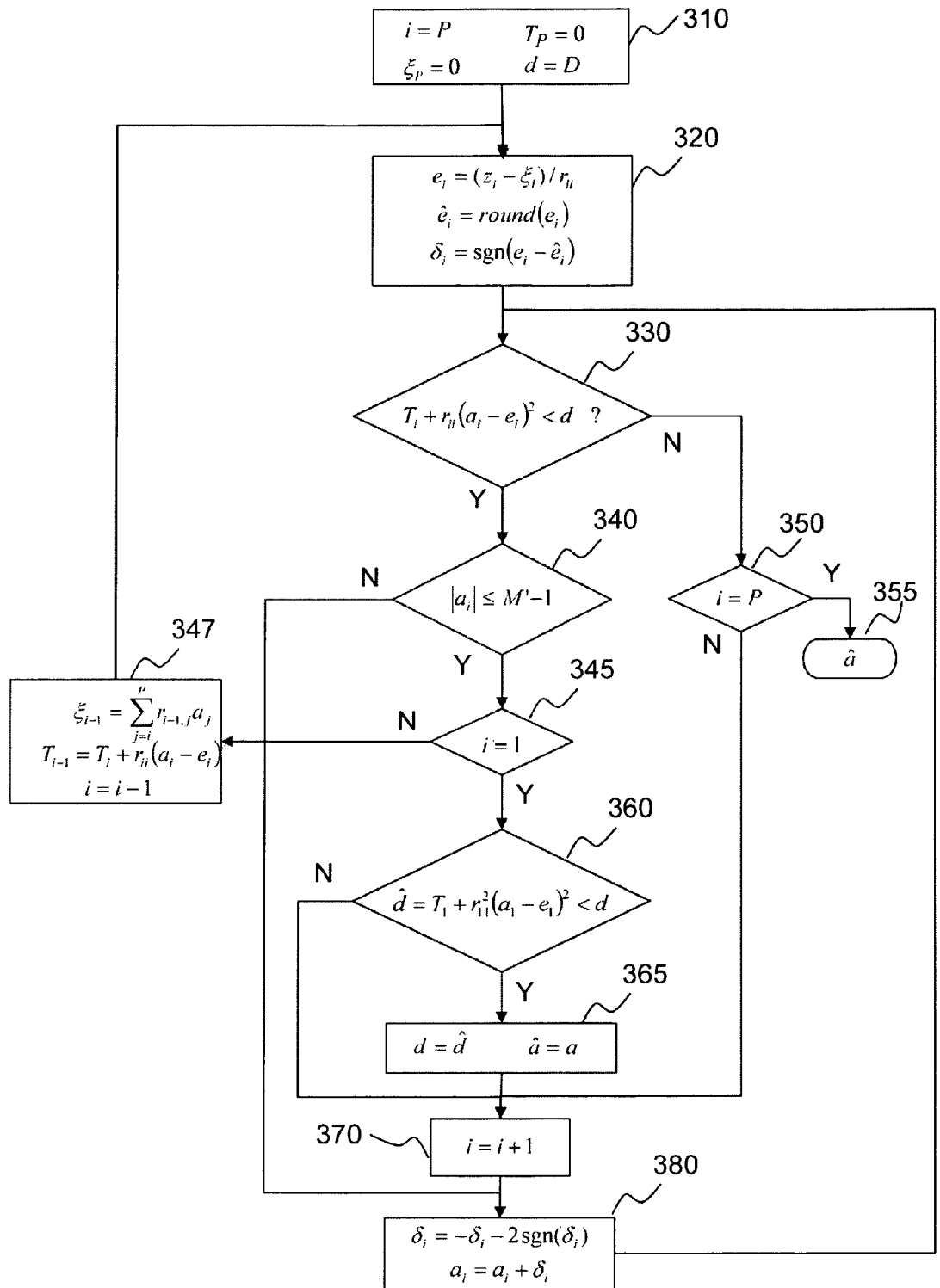
FIG. 3 represents the flow diagram of a second sphere decoding algorithm known from the prior art.
Figure 4A:
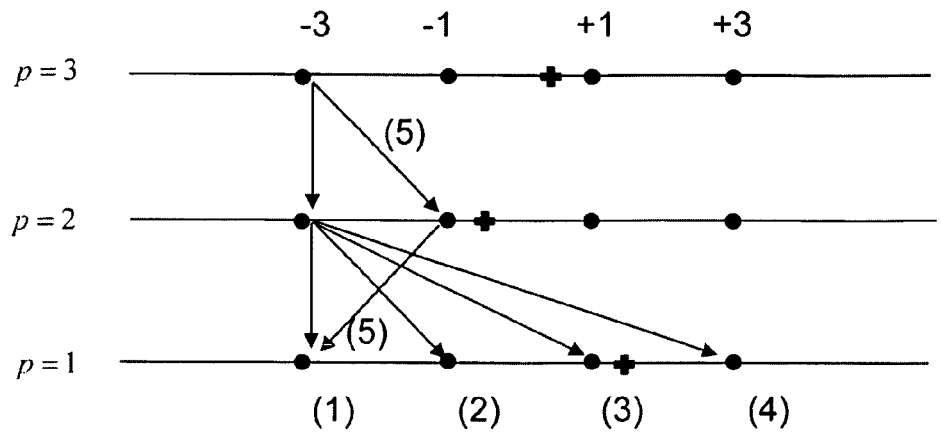
FIGS. 4A and 4B illustrate the scanning of points used respectively by the first and the second sphere decoding algorithms.
Figure 4B:
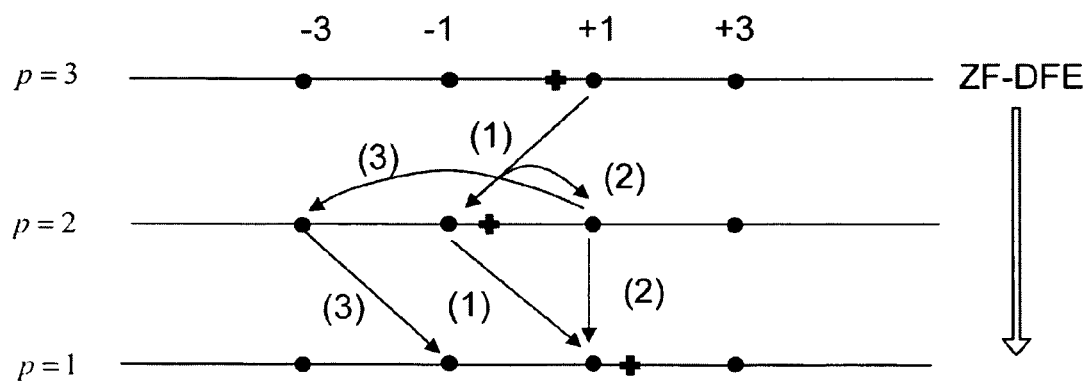

We will consider hereafter a system comprising P sources of PPM-PAM symbols. The modulation alphabet comprises M temporal positions and, for each of these temporal positions, M' amplitude values. It will be recalled that any element of this alphabet may be written in the form of a sequence $a_m = \delta(m-\mu)\alpha$, $\mu=1, \ldots, M$ where $\alpha$ is a constellation symbol M'-PAM. As indicated above, the sources of symbols may be the flow of symbols emitted by the antenna of a MIMO terminal, flow of symbols from or to a plurality of users, or even a combination of these two situations if each user terminal is equipped with a plurality of antennas. In the general case, $$P = \sum_{k=1}^{K} i_k$$

there $i_k$ is the number of antenna of the terminal of the user k and K the number of users. It will be assumed hereafter that the flows of symbols are emitted in a synchronous manner. These flows of symbols modulate advantageously but not necessarily frames of pulsed UWB signals.

The receiver is adapted to calculate P'M decision variables with P'>P. For example, each receiving antenna is equipped with a Rake receiver suited to separate L paths, and for each path the M temporal positions of the PPM modulation. The decision variables are then the P'M outputs of these Rake receivers with $P'=L.P^r$, where $P^r$ is the number of reception antenna. If a spatial-temporal coding is used at the emission, a filtering matched to this code is used in reception to separate the different users and in this case $P'=L.P^r.P$.

In all cases, the signal received by the receiver may be represented by a vector x of dimension P'M corresponding to the P'M decision variable values. The vector x may be expressed, by adopting the same notations as for equation (1), in the form x=Ha+n, except that the vector n is here of dimension P'M, the vector a of dimension PM and the matrix H of size P'M×PM. The vector a may be considered as the concatenation of P sub-vectors $a^{(1)}, a^{(2)}, \ldots, a^{(P)}$ each sub-vector being relative to a source. The matrix H represents the transmission channel and takes into account the multi-user and multi-path interferences.

If R is the matrix of size PM×PM obtained by QR transformation of the matrix H, $z=Q^T_x$ is an exhaustive information of the signal received belonging to the space of the signals transmitted. The sphere decoding consists in searching the point â, belonging to the intersection of the product constellation and a noise sphere centred on z and for which the distance to z is minimal. By product constellation we mean the constellation generated by the hybrid PPM-PAM constellations of the different sources. The receiver determines among the $(MM')^P$ points of the product constellation, in other words among the $(MM')^P$ possible combinations of PPM-PAM symbols emitted by the P sources, that which meets the criterion of maximum likelihood. One will note, as previously, for any matrix Q of size PM×PM, $\Omega^{(i,j)}$ the submatrix of size M×M of R constituted of the elements $\omega_{m,m'}$ with $m=(i-1)M+1, \ldots, iM$ and $m'=(j-1)M+1, \ldots, jM$, with $1 \leq i,j \leq P$ and $\Omega_{m,m'}^{(i,j)}$, the (m,m') the element of the matrix $\Omega^{(i,j)}$, in other words $\Omega_{m,m'}^{(i,j)} = \omega_{m,m'}$.

The decoding method uses a ZF-DFE equalisation of the signal transmitted. More precisely, one firstly calculates:

$$e_P = Vz \text{ with } V = R^{-1} \tag{15}$$

or more simply since one begins by the final layer (layer of order P), due to the upper triangular shape of the matrix R:

$$e_P^{(P)} = V^{(P,P)} z^{(P)} \text{ with } V^{(P,P)} = (R^{(P,P)})^{-1} \tag{16}$$

The vector $e_P^{(P)}$ is of dimension M and has real values. One determines the PPM-PAM symbol $\hat{a}^{(P)}$ the closest to $e_P^{(P)}$ in the sense of a certain distance that we will detail later. More precisely, one determines respectively the position pos(P) and the amplitude $\alpha_{pos(P)}$ giving the components $\hat{a}_m^{(P)} = \alpha_{pos(P)} \delta(m-pos(P))$. As will be seen later, pos(P) and $\alpha_{pos(P)}$ are determined according to a process of competition between PPM positions. The ZF-DFE estimation of z(P) is expressed as $\hat{a}^{(P)} = \hat{e}_P^{(P)} = \alpha_{pos(P)} I_{,pos(P)}^M$, where $I^M$ is the unit matrix of size M×M, in other words $\hat{a}^{(P)}$ is a vector of size M the components of which are zero with the exception of that of index pos(p), equal to $\alpha_{pos(P)}$.

One notes $\hat{e}_P$ the vector of size MP for which the (P-1)M first components are zero and the M last are equal to those of $\hat{e}_P^{(P)}$.

One subtracts from the lower layers the interference due to the layer P and one then estimates $\hat{a}^{(P-1)}$, more precisely:

$$e_{P-1} = V(z - R\hat{e}_P) \tag{17}$$

or instead, since R and V are upper triangulars:

$$e_{P-1}^{(P-1)} = V^{(P-1,P-1)}(z^{(P-1)} - R^{(P-1,P)}\hat{e}_P^{(P)}) + V^{(P-1,P)}(z^{(P)} - R^{(P,P)}\hat{e}_P^{(P)}) \tag{18}$$

and the ZF-DFE estimation is nothing else than $\hat{a}_{P-1} = \hat{e}_{P-1}^{(P-1)} = \alpha_{pos(P-1)} I_{,pos}^M$ where pos(P-1) and $\alpha_{pos(P-1)}$ are obtained by the abovementioned process of competition between PPM positions.

One thereby proceeds layer by layer, eliminating at each layer p, the interference due to the P-p upper layers. When the P layers have been subjected to the ZF-DFE equalisation, one has a vector â defined by the concatenation of $\hat{a}^{(p)}$ for $p=1, \ldots, P$.

This vector may be represented by a point of the PPM-PAM constellation produced. One starts from this point to search the closest neighbour of z. The search then continues within said constellation, according to a method of enumeration described hereafter.

It has been seen above that, for each layer p, one determined the symbol $\hat{a}^{(p)}$ nearest to $e_p^{(p)}$. The contribution of this layer to the quadratic distance between z and â may be expressed:

$$d_p = \|R^{(p,p)}(\hat{a}^p - e_p^{(p)})\|^2 \tag{19}$$

given that $\hat{a}^{(p)} = \alpha_{pos(p)} \delta(m-pos(p))$, this contribution is expressed as:

$$d_p = \|R^{(p,p)}(\alpha_{pos(p)} I_{,pos(p)} - e_p^{(p)})\|^2 = \|\alpha_{pos(p)} R_{,pos(p)}^{(p,p)} - E^{(p)}\|^2 \quad (20)$$

with $E^{(p)} = R^{(p,p)} e_p^{(p)}$.

It will be noted that in the absence of interference between the different modulation positions, in other words if the impulse response of the transmission channel is shorter than the temporal distance between these positions, the matrix $R^{(p,p)}$ is diagonal and that the quadratic distance $d_p$ is identical to the quadratic distance between the PPM-PAM symbol tested $\hat{a}^{(p)}$ and the signal equalised by source.

The expression (20) can be developed in the following form:

$$d_p = (E^{(p)})^T E^{(p)} - 2\alpha_{pos(p)} (R_{,pos(p)}^{(p,p)})^T E^{(p)} + (\alpha_{pos(p)})^2 (R_{,pos(p)}^{(p,p)})^T R_{,pos(p)}^{(p,p)} \quad (21)$$

One now considers a given PPM position pos(p) and that one searches the PAM symbol in this position that minimises $d_p$. Given that the first term $(E^{(p)})^T E^{(p)}$ does not depend on $\alpha_{pos(p)}$, the minimum is obtained, by deriving (21), for:

$$\tilde{\alpha}_{pos(p)} = \frac{\left(R_{,pos(p)}^{(p,p)}\right)^T E^{(p)}}{\left(R_{,pos(p)}^{(p,p)}\right)^T R_{,pos(p)}^{(p,p)}} \quad (22)$$

where one has noted here $\tilde{\alpha}_{pos(p)}$ a real variable for the requirements of the derivation. The distance $d_p$ is therefore minimal for:

$$\alpha_{pos(p)} = \text{round}(\tilde{\alpha}_{pos(p)}) \quad (23)$$

where round(x) is the odd integer the closest to x.

For a given position pos(p), the PAM symbols in this position are tested from the value $\alpha_{pos(p)}$ then successively on either side of this value moving further and further away from the minimum. More precisely, the following values of the position pos(p) are tested according to the sequence:

$$\alpha_{pos(p)}; \alpha_{pos(p)} + 2\Delta_{pos(p)}; \alpha_{pos(p)} - 1\Delta_{pos(p)}; \alpha_{pos(p)} + 1\Delta_{pos(p)}; \alpha_{pos(p)} - 1\Delta_{pos(p)}; \quad (24)$$

with $\Delta_{pos(p)} = \text{sign}(\tilde{\alpha}_{pos(p)} - \beta_{pos(p)})$, as long as one remains within the bounds of the PAM constellation $[-M'+1, M'-1]$. On account of the parabolic variation of $d_p$, the contributions of the successive PAM symbols of the list (24) are increasing.

To select the PPM-PAM symbols to be tested within a layer, one then proceeds as follows.

For each PPM position $m \in \{1, \ldots, M\}$, one determines a list $L_m^p$ giving the list of PAM symbols for this position, noted $\alpha_m^p$ and sorted by increasing contributions $d_p$ as in (24). Each list $L_m^p$ corresponds to an increment value $\Delta_m^p$ and a pointer $\pi_m^p$ pointing to the symbol $\alpha_m^p$ being tested.

Each time that one arrives at the layer p to carry out a new ZF-DFE equalisation $e_p^{(p)}$, i.e. arriving there by the layer p+1, one determines the lists $L_m^p$ for $m \in \{1, \ldots, M\}$ and one initialises the pointers $\pi_m^p$ on the first respective elements of these lists. One determines the first PPM position to be tested of the layer p by a competition between lists. The winning PPM position is given by:

$$pos(p) = \underset{m}{\text{argmin}}(\alpha_m^p) \quad (25)$$

The first PPM-PAM symbol tested of the layer p is consequently defined by:

$$\min_m(\alpha_m^p) \delta\left(m - \underset{m}{\text{argmin}}(\alpha_m^p)\right).$$

One increments then the pointer $\pi_{pos(p)}^p$ so that it now points towards the second element of the list $L_{pos(p)}^p$, i.e. $\alpha_{pos(p)}^p + 2\Delta_{pos(p)}^p$.

At the following passage in the layer p, without ZF-DFE equalisation, i.e. arriving as will be seen by the layer p−1, one again carries out a competition between lists, the candidates of each list being designated by the pointers $\pi_m^p$. If one notes $PAM(\pi_m^p)$ the M candidates, the winning PPM position is given by:

$$pos(p) = \underset{m}{\text{argmin}}(PAM(\pi_m^p)) \quad (26)$$

and the corresponding PPM-PAM symbol to select is defined by the components $\alpha_{pos(p)}^p \delta(m - pos(p))$.

One proceeds in this way for each passage in the layer p. If, for a given PPM position m, all the PAM symbols of the list $L_m^p$ have been tested, one sets a flag for the position in question so that they are no longer taken into account. More precisely, from the moment that for the $i^{th}$ passage in position m, one has:

$$\alpha_{pos(p)} + 2^{i+1}(-1)^{i+1}\Delta_{pos(p)} < -M'+1 \text{ or } \alpha_{pos(p)} + 2^{i+1}(-1)^{i+1}\Delta_{pos(p)} > M'-1$$

and that for the following passage in this position one has:

$$\alpha_{pos(p)} + 2^{i+2}(-1)^{i}\Delta_{pos(p)} < -M'+1 \text{ or } \alpha_{pos(p)} + 2^{i+2}(-1)^{i}\Delta_{pos(p)} > M'-1$$

in other words, as soon as one has crossed the upper and lower bounds of the PAM constellation, a flag $flag_m^p$ is set i.e. $flag_m^p = 1$. If one observes that $$\prod_{m=1}^{M} flag_m^p = 1,$$

in other words that all the PPM-PAM symbols of the layer p have been tested, one passes on to the upper layer p+1, to search a new PPM-PAM symbol in this latter layer.

Figure 5:
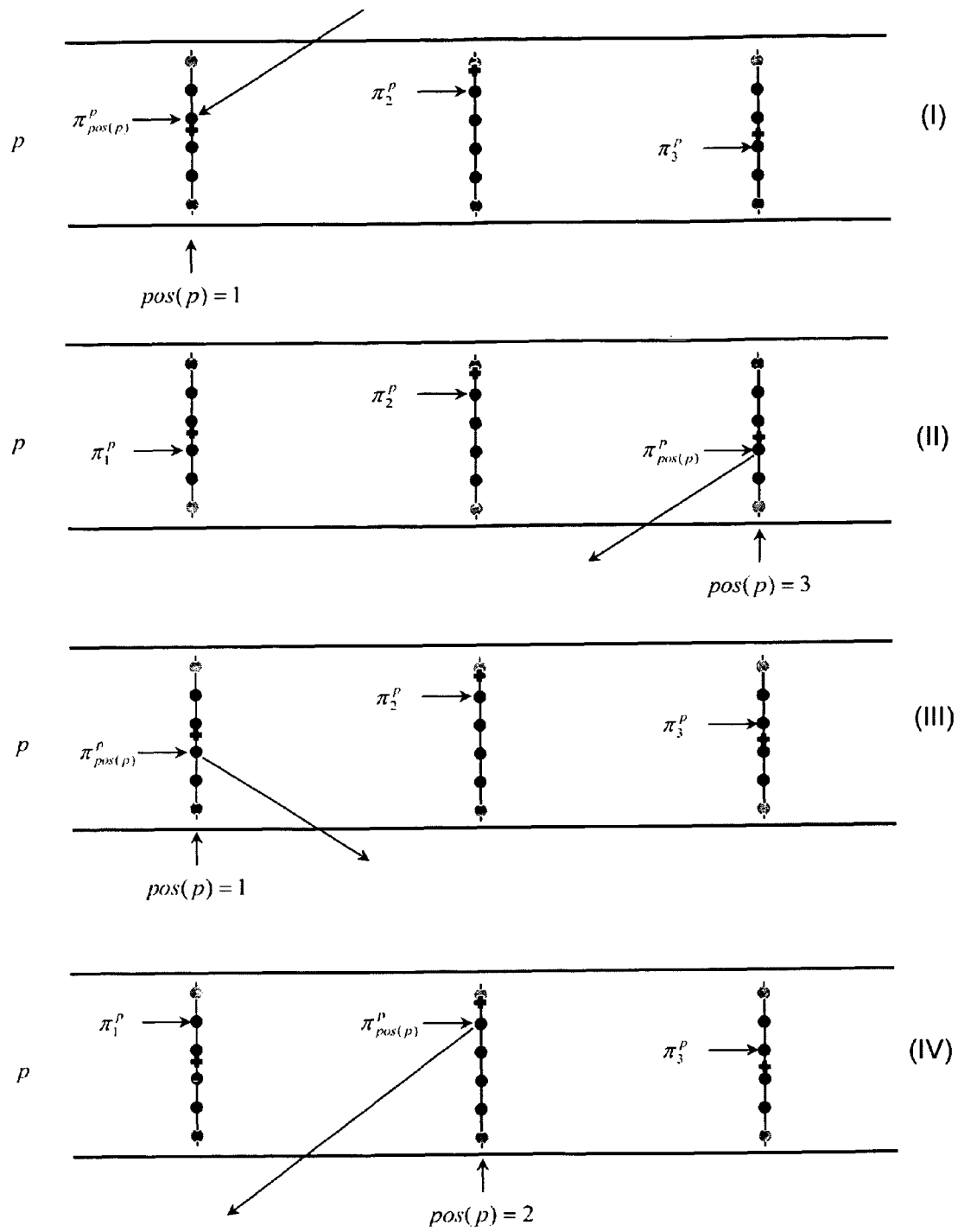
FIG. 5 represents the enumeration of PPM-PAM symbols within a layer for an embodiment of the invention.

In FIG. 5 the manner in which the PPM-PAM symbols were enumerated within a layer p is illustrated. It has been assumed here that the constellation was 3-PPM-4-PAM and the PPM positions are represented by vertical bars. The points of the constellation are indicated by black discs, the points outside the constellation but belonging nevertheless to the network of points are represented by grey discs. The components of $e_p^{(p)}$ on the different PPM positions, in other words of the signal received from the source p after ZF-DFE equalisation, are represented by black crosses.

During a passage (I) in the layer p, from the layer p+1, after equalisation, the initial positions of the pointers are determined for each of the PPM positions. After competition between the three lists, the position 1 is retained and the symbol selected is (1,+1). It is this symbol $\hat{a}_p$ that will be used for the equalisation of the lower layers. The pointer of the list $L_1^p$ is displayed towards the following symbol of the list, i.e. (1,−1).

During a second passage (II), from the layer p−1, the competition between lists gives the winning position 3. The symbol selected is (3,−1). As previously, this symbol is used for the equalisation of the lower layers. The pointer of the list $L_3$ is displayed towards the following symbol of the list, i.e. (3,+1).

During a third passage (III), from the layer p−1, the competition between lists gives the winning position 1. The pointer of the list $L_1^p$ is displayed towards the following symbol of the list, i.e. (i,+3).

During a fourth passage (IV), from the layer p−1, the competition between lists gives this time the winning position 2. The symbol selected is (2,+3) the pointer of the list $L_2^P$ is displayed towards the following symbol of the list, i.e. (2,+1).

The sphere decoding begins by the final layer (layer P). One arranges the lists $L_m^P$, m=1, ... M of PPM-PAM symbols of this layer as has been seen above. One selects firstly that which would make the lowest contribution $d_P$ to the quadratic distance to the signal received by means of the competition between lists. One eliminates the interference generated by the symbol $\hat{a}_P$ on all of the lower layers P-1, P-2, ..., 1. One then moves on to the immediately lower layer and one restarts in this way for each layer p>1.

One progresses in this way layer by layer, the symbols selected in the different layers forming a branch. If the sum of the contributions of the upper layers and the current layer is greater than the current radius of the sphere, one abandons the branch in question and one passes on to the layer upper to the current layer to select a new PPM-PAM symbol. Conversely, one pursues the branch until one attains the layer of rank 1. The quadratic distance between the point â of the product constellation to the received point is obtained as the sum of the contributions of the different layers, i.e.

$$\sigma_1 = \sum_{k=1}^{P} d_k.$$

If the distance is lower than the current radius of the sphere, the radius as well as the best current point $\hat{a}_{opt}$ are updated. More precisely, the new radius of the sphere takes the value of said distance and $\hat{a}_{opt} = \hat{a}$.

One then returns to the immediate upper layer (here layer 2) to select the second PPM-PAM symbol of this layer thanks to the competition between lists. One eliminates from the lower layers (here the layer of rank 1) the interference generated by this symbol and one proceeds as previously.

Generally speaking, let us assume that one arrives at a layer p+1 from the lower layer p. If the lists $L_m^{p+1}$ are used up, in other words if one has already previously tested the MM' symbols of this layer, or instead if the sum of the contributions $$\sigma_{p+1} = \sum_{k=p+1}^{P} d_k$$

is greater than the current quadratic radius, one passes on to the following upper layer.

One progresses in this way, by successive ascents towards higher and higher layers of ranks and with narrower and narrower intervals of validity (given that the radius of the sphere is updated), until one has used up the list of the root layer (layer P), in which case the algorithm stops. In decoding output, the best output point $\hat{a}_{opt}$ is that which achieves the minimum of distance to z. The point $\hat{a}_{opt}$ provides the ML estimation of the PPM-PAM symbols transmitted by the P sources, i.e. $\hat{a}_{opt}^{(1)}, \hat{a}_{opt}^{(2)}, \ldots, \hat{a}_{opt}^{(P)}$.

Figure 6:
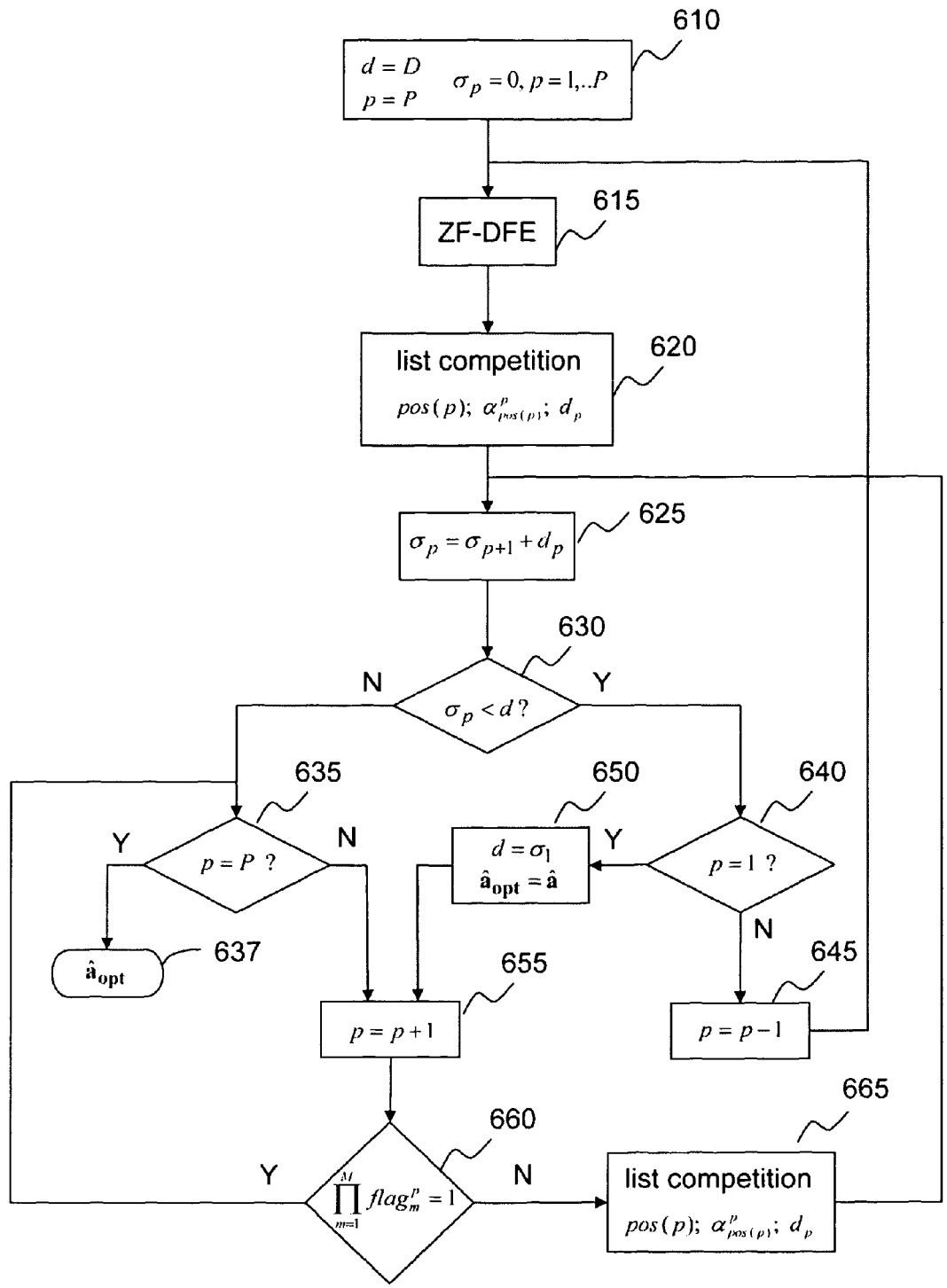
FIG. 6 represents the flow diagram of a sphere decoding algorithm according to an embodiment of the invention.

FIG. 6 represents in a schematic manner the flow diagram of the sphere decoding method of a plurality of PPM sources according to the invention.

At step 610, one initialises the layer index by that of the highest, p=P. One initialises the intermediate variables, particularly the quadratic radius d of the sphere, d=D and P variables representing respectively the sum of the contributions to the quadratic distance up to the respective P layers $$\sigma_p = \sum_{k=p}^{P} d_p,$$

i.e. $\sigma_p = 0$ for p=1, ..., P.

At step 615, one performs the ZF-DFE equalisation of the current layer p considering the symbols $\hat{a}^{(P)}, \hat{a}^{(P-1)}, \ldots, \hat{a}^{(p+1)}$ selected in the previous upper layers.

At step 620, one determines the ordered lists $L_m^p$ and the first elements $\alpha_m^p$ of each of these lists. One initialises the pointers $\pi_m^p$ so that they point towards these first elements. One determines pos(p) and $\alpha_{pos(p)}^p$ thanks to the competition between lists then one calculates the contribution $d_p$ thanks to (21). One also resets the flags of overrunning the intervals of validity flag$_m^p$=0, m=1, ..., M.

At step 625, one updates $\sigma_p$, the sum of the contributions of the layers p, ..., P to the Euclidian distance to z, i.e. $\sigma_p = \sigma_{p+1} + d_p$, considering the PPM-PAM symbols selected in these layers.

One then tests if the sum of these contributions exceeds the current quadratic radius d of the sphere. If this is the case, it is pointless conserving the current branch $\hat{a}^{(P)}, \hat{a}^{(P-1)}, \ldots, \hat{a}^{(p)}$ since it cannot, whatever the symbols that are selected in the following lower layers, lead to the closest neighbour. One then moves on to the test 635. On the other hand if $\sigma_p$ is lower than said quadratic radius, one moves on to test 640.

In 635, one tests if p=P. If this is the case, the algorithm ends in 637 and the closest neighbour of z belonging to the network is $\hat{a}_{opt}$.

If p≠P, one increments p on 655 and one tests in 660 if one has used up all the PPM-PAM symbols of the layer in question, in other words if $$\prod_{m=1}^{M} flag_m^p = 1.$$

In the affirmative, one returns to the test 635. In the negative, in 665, one carries out the competition between lists and one selects the new PPM-PAM symbol of the layer. One updates the pointers $\pi_m^p$ and the flags flag$_m^p$, for m=1, ..., M. One also updates the value of d corresponding to the new symbol selected and one returns to step 625. In practice, if one has previously calculated and stored the values $d_p$ for the different PPM-PAM symbols in 620, it is not necessary to recalculate $d_p$.

If it is decided to conserve the current branch $\hat{a}^{(P)}, \hat{a}^{(P-1)}, \ldots, \hat{a}^{(p)}$ in 630, one tests in 640 if this branch has reached the lowest layer (p=1), in which case one has a point of the network improving the current distance to z and one moves on to step 650. If, on the other hand it is not the case (p≠1), one passes on to the following lower layer in 645, then one returns to the ZF-DFE equalisation step.

At step 650, one updates the radius of the sphere, i.e. $d = \sigma_1$ and the best candidate $\hat{a}_{opt} = \hat{a}$, then the search is continued by incrementing p at step 655.

The best candidate gives a joint ML estimation $\hat{a}_{opt}^{(1)}, \hat{a}_{opt}^{(2)}, \ldots, \hat{a}_{opt}^{(P)}$ of the PPM-PAM symbols emitted by the P sources.

Figure 7:
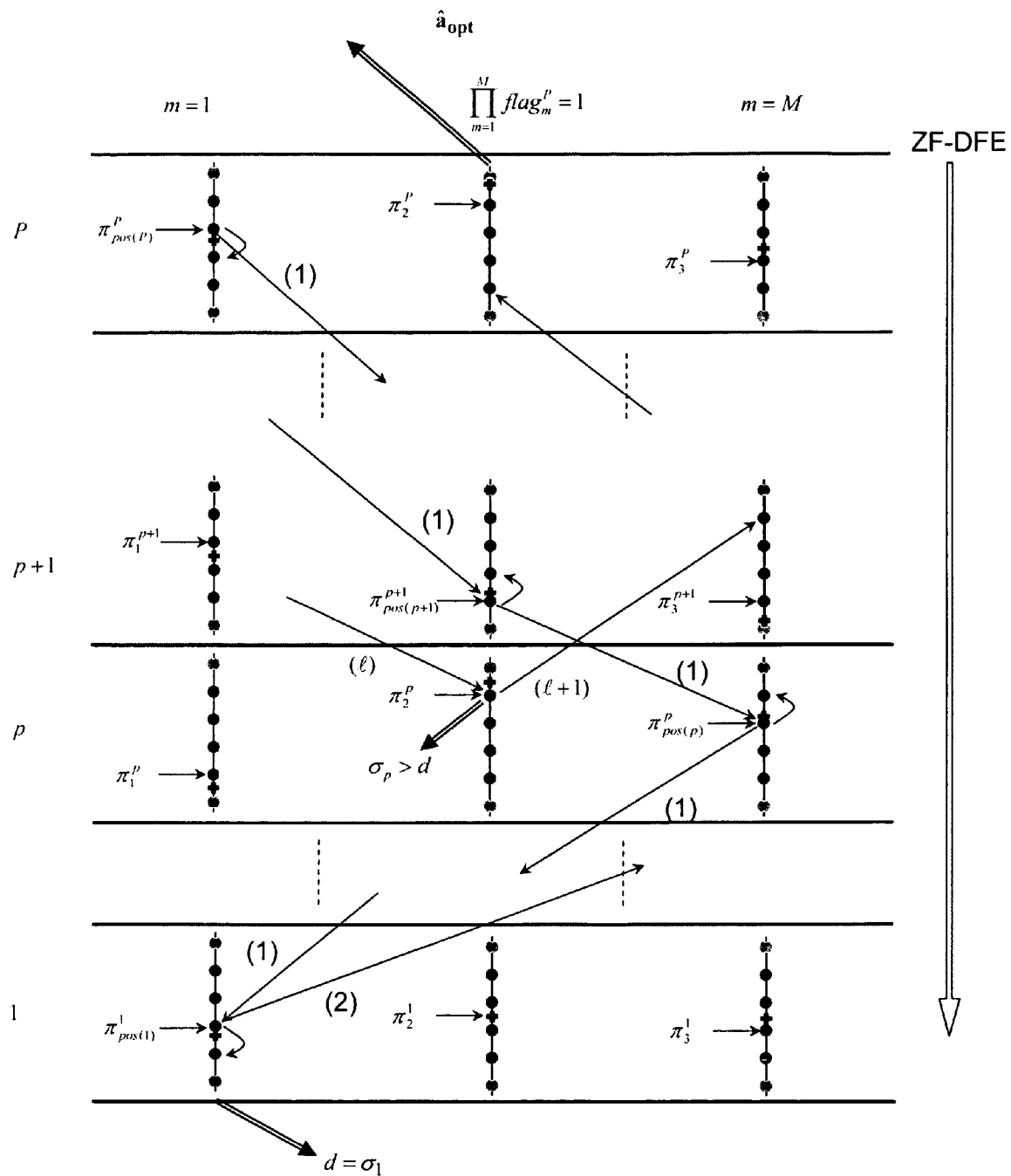
FIG. 7 represents an example of progression through the constellation produced by the sphere decoding algorithm according to the invention.

The progression of the sphere decoding within the constellation produced is illustrated in FIG. 7. The space of the symbols transmitted is divided into P layers, each comprising M positions at M' amplitude levels. One has represented in the ordinates for each of the PPM positions of each layer p the M components of $e_p^{(p)}$, obtained as has been seen by ZF-DFE equalisation.

The branch noted (1) is the first branch tested. In the present case, the branch progresses up to the lowest layer and improves the quadratic distance to z. The quadratic radius d of the sphere is then updated. One passes on to the layer 2 and the test of a new branch (2). Given that one has selected a new candidate in the layer (2), one carries out beforehand a new equalisation of the layer 1.

One has represented by (l) a branch being tested. It may be noted that when this branch reaches the layer p, the sum $\sigma_p$ of the contributions of the upper layers and the current layer P, P−1, . . . , p, exceeds the current quadratic radius d of the sphere. The search continues by moving to the upper layer p+1 and by selecting in this layer the PPM-PAM symbol (cf. step 665 of FIG. 6). One updates the sum of the contributions, $\sigma_{p+1}$. If this sum is lower than d, one continues with the new branch (l+1), if not one again ascends a layer.

When one reaches the highest layer (cf. step 635 of FIG. 6) and that, either one has used up the symbols of the lists $$L_m^P \left( \prod_{m=1}^{M} flag_m^P = 1 \right),$$

or the contribution of the layer P exceeds d, the algorithm decoding ends by providing $\hat{a}_{opt}$.

The pseudo-code of the sphere decoding method according to a possible embodiment of the invention is given in the appendix. The following notations have been adopted:

$0_M$ is the null vector of size M $1_M$ is a vector of size M, in which all the components are equal to 1;

flag and flag1 are matrices of sizes MP. They indicate for each of the layers and for each PPM position in this layer the overrun conditions of the bounds of the PAM constellation situated in this position;

$\rho$ is a vector of size M;

e and E are matrices of size MP×P, the columns of e give the result of the ZF-DFE equalisation;

A is a matrix of size M×P, the columns of which are the M components of the PPM-PAM symbols selected for the different layers;

$diag(\Omega)$ is the diagonal matrix composed of diagonal elements of the matrix $\Omega$;

$Diag(\Omega)$ is a vector, the components of which are the diagonal elements of the matrix $\Omega$;

Round(x) is the integer nearest to x;

$C_0$ is a positive number greater than the initial distance. It weights in the cost function the PPM positions in which all the PAM symbols have been tested (crossing of the lower and upper bounds of the PAM constellation), so as to exclude them from the selection.

The sphere decoding method described above is intended to be implemented by means of software or hardware means in a ML receiver operating in a multi-source system, for example a MIMO system and/or a multi-user system. Advantageously, the PPM symbols of a source serve to modulate a pulsed signal of the TH-UWB (Time Hopped UWB), DS-UWB (Direct Spread UWB) or TH-DS-UWB type. The signals thus modulated are transmitted for example by means of conventional UWB antenna or laser diodes.

APPENDIX

Sphere decoding
(input: z, R, P, M, M', D; output:$\hat{a}_{opt}$):

Step 1 (Initialisation):
Set k = P + 1; dist(k) = 0; V = $R^{-1}$; $\rho = 0_M$; bestdist = D
$C_0$ positive number such as $C_0$ > D Step 2: newdist = dist(k) + $\rho^T \rho$;
if (newdist < bestdist) & (k ≠ 1) go to Step 3 else go to Step 4 endif.

Step 3: 
3.1 if k = P + 1, $e_{\cdot,k-1}$ = Vz else
3.2 for i = 1,...,k − 1, $e_{\cdot,k-1}^{(i)} = e_{\cdot,k}^{(i)} - V^{(i,k)}\rho$ endfor endif.
3.3 k = k − 1, dist(k) = newdist
3.4 $E_{\cdot,k}^{(k)} = R^{(k,k)} e_{\cdot,k}^{(k)}$
3.5 [pos(k),$\alpha_{pos(k)},\alpha_{\cdot,k},\tilde{\alpha}_{\cdot,k},d_{\cdot,k}$] = list_complete($E_{\cdot,k}^{(k)},R^{(k,k)},M'$)
3.6 $A_{\cdot,k} = \alpha_{pos(k)} I_{\cdot,pos(k)}$
3.7 $step_{\cdot,k} = 0_M$, $step_{pos(k),k} = 2sign(\tilde{\alpha}_{step(k),k} - \alpha_{step(k),k})$
3.8 $flag_{\cdot,k} = 0_M$, $flag1_{\cdot,k} = 0_M$
3.9 if $\alpha_{pos(k),k} + step_{pos(k),k} < -M'+1$ or
$\alpha_{pos(k),k} + step_{pos(k),k} > M'-1$,
3.10 $step_{pos(k),k} = -2sign(step_{pos(k),k})$, $flag_{pos(k),k}^1 = 0$ endif
3.11 $\rho = E_{\cdot,k}^{(k)} - \alpha_{pos(k)} R_{\cdot,pos(k)}^{(k,k)}$, go to Step 2.

Step 4: 
4.1 if newdist < bestdist, bestdist = newdist
4.2 for, i = 1,..., P, $\hat{a}_{opt}^{(i)} = A_{\cdot,j}$, endfor
4.3 else if k = P, terminate else k = k + 1 endif.
4.4 if $\Pi_{m=1}^{M} flag_{m,k} = 1$ go to Step 4 endif.
4.5 ! generation of the new PPM-PAM symbol to be tested 4.6 $d_{step(k),k} = -2(R_{\cdot,pos(k)}^{(k,k)})^T E_{\cdot,k}^{(k)}(\alpha_{pos(k),k} + \Delta_{pos(k),k}) +$
$[(R_{\cdot,pos(k)}^{(k,k)})^T R_{\cdot,pos(k)}^{(k,k)}](\alpha_{pos(k),k} + \Delta_{pos(k),k})^2 + C_0 flag_{pos(k),k}$ 4.7 $pos(k) = \arg\min_{m \in \{1,...,M\}}(d_{m,k})$ 4.8 $\alpha_{pos(k),k} = \alpha_{pos(k),k} + step_{pos(k),k}$
4.9 if $step_{pos(k),k} = 0$, $step_{pos(k),k} = 2sign(\tilde{\alpha}_{step(k),k} - \alpha_{step(k),k})$
4.10 else
$step_{pos(k),k} = (-1)^{flag1_{pos(k),k}} step_{pos(k),k} - 2flag1_{pos(k),k} sign(step_{pos(k),k})$
endif APPENDIX-continued

```
4.11    if α_{pos(k),k} + step_{pos(k),k} < -M'+1 or
        α_{pos(k),k} + step_{pos(k),k} > M'-1,
4.12    if flag1_{pos(k),k} ≠ 0, flag1_{pos(k),k} = 0,
        step_{pos(k),k} = -2sign(step_{pos(k),k})
4.13    else flag_{pos(k),k} = 1 endif
4.14    if α_{pos(k),k} + step_{pos(k),k} < -M'+1 or
        α_{pos(k),k} + step_{pos(k),k} > M'-1,
4.15    flag_{pos(k),k} = 1 endif endif
4.16    α_{pos(k)} = α_{pos(k),k}, A_{.,k} = α_{pos(k)} I_{.,pos(k)}
4.17    ρ = E_{.,k}^{(k)} - α_{pos(k)} R_{.,pos(k)}^{(k,k)}, go to Step 2
```

List competition subroutine:
list_compete(input:E, R, M'; output:pos, amp, α, α̃, d)

Step 1:     $E_1 = R^T E$, $\tilde{E}_1 = \text{diag}(E_1)$
Step 2:     $E_2 = \text{Diag}(R^T R)$, $\tilde{E}_2 = \text{diag}(E_2)$
Step 3:     $\tilde{α} = \text{Diag}(\tilde{E}_1(\tilde{E}_2)^{-1})$ Step 4:     for m = 1,..., M  $α_m = 2\text{Round}\left(\frac{\tilde{α}_m + M' - 1}{2}\right) - M' + 1$ Step 5:     $α_m = \max(1 - M', α_m); α_m = \min(M'-1, α_m)$ endfor
Step 6:     $d = -2\text{Diag}(\tilde{E}_1 \text{diag}(α)) + \text{Diag}(\tilde{E}_2(\text{diag}(α))^2)$
Step 7:     $\text{pos} = \arg\min_m(d_m)$;
            $\text{amp} = α_{pos}$

The invention claimed is:

1. Sphere decoding method for maximum likelihood receiver intended to receive PPM-PAM symbols from a plurality P of sources, each source emitting a flow of PPM-PAM symbols at M positions and at M' modulation amplitudes, P PPM-PAM symbols emitted simultaneously by the P sources being represented by a point (a) of the modulation product constellation in a space of the signals transmitted of dimension MP decomposed into P layers, each layer representing the M possible modulation positions and in each of these positions the M' possible amplitudes of a PPM-PAM symbol emitted by this source, the signal received (x) by said receiver being transformed into a point representative (z) of this signal, referred to as the received point, in the space of the transmitted signals, said method determining the point of the product constellation the closest ($\hat{a}_{opt}$) to the received point within a sphere of given quadratic radius, characterised in that, for each layer of rank p:
(a) one carries out a ZF-DFE equalisation of the signal received in said layer considering the PPM-PAM symbols estimated in the P-p previous layers, referred to as layers higher than the layer p;
(b) one selects a PPM-PAM symbol of this layer:
(b1) by classifying, for each PPM position of said layer, the list ($L_m^p$) of PAM symbols in this position, as a function of the contributions that they would make to the quadratic distance to the received point and by retaining for each list the PAM symbol making the lowest contribution, referred to as the list champion;
(b2) by selecting the PPM position (pos(p)) making the lowest contribution ($d_p$) and by selecting as PPM-PAM symbol ($α_{pos(p)}δ(m-\text{pos}(p))$) the list champion in the position thereby determined;
(c) this contribution is added to those obtained for the previous layers to obtain a sum of contributions ($σ_p$); the steps (a), (b), (c) being repeated until one attains the lowest layer; and
one updates the quadratic radius of the sphere and said closest point if said sum of contributions is lower than the quadratic radius of the sphere.

2. Sphere decoding method according to claim 1, characterised in that within the step (b), the step (b2) is followed by a step (b3) in which one chooses as new list champion relative to the position selected the following PAM symbol in this list.

3. Sphere decoding method according to claim 2, characterised in that, if for a given layer and a PPM-PAM symbol selected in this layer, said sum of contributions exceeds the quadratic radius of the sphere, one passes on to the upper layer and one selects a new PPM-PAM symbol in this layer according to step (b).

4. Sphere decoding method according to claim 3, characterised in that if all the symbols of said layer upper have already been the subject of a selection, one passes on to the yet upper layer to select there a new PPM-PAM symbol according to step (b).

5. Sphere decoding method according to claim 3, characterised in that if one has reached the highest layer and that, either one has selected all the PPM-PAM symbols of said layer, or the contribution of said layer calculated for the symbol selected exceeds the quadratic radius of the sphere, the decoding method ends by providing said closest point ($\hat{a}_{opt}$).

6. Sphere decoding method according to claim 5, characterised in that the PPM-PAM symbols of the respective sources of ranks 1, ..., P, estimated in the sense of maximum likelihood, are obtained as sub-vectors ($\hat{a}_{opt}^{(1)}, \hat{a}_{opt}^{(2)}, ..., \hat{a}_{opt}^{(3)}$) of M components of the vector of MP components representing said closest point ($\hat{a}_{opt}$).

7. Sphere decoding method according to claim 6, characterised in that for a given layer of rank p and a PPM position m of this layer, said list relative to this position is, after sorting:

$$α_m; α_m+2Δ_m; α_m-2Δ_m; α_m+4Δ_m; α_m-4Δ_m; ...$$

with $Δ_m = \text{sign}(\tilde{α}_m - α_m)$ where $\tilde{α}_m$ is a real value representative of the signal received in position m, after equalisation of the source p, and $α_m$ the integer the nearest to $\tilde{α}_m$, corresponding to an amplitude of the PAM constellation.

8. Sphere decoding method according to claim 7, characterised in that the real value representative of the signal received in position m, after equalisation of the source p is obtained by:

$$\tilde{α}_m = \frac{(R_{.,m}^{(p,p)})^T E^{(p)}}{(R_{.,m}^{(p,p)})^T R_{.,m}^{(p,p)}}$$

where $R^{(p,p)}$ is the $p^{th}$ sub-matrix of size M×M on the diagonal of the upper triangular matrix R of size MP×MP, obtained by QR transformation of a matrix H representative of the transmission channel between the P sources and said receiver;

$R_m^{(p,p)}$ is the $m^{th}$ column of the matrix $R^{(p,p)}$; and $E^{(p)}=R^{(p,p)}e_p^{(p)}$ where $e_p^{(p)}$ represents the signal received from the source p after ZF-DFE equalisation.

9. Maximum likelihood receiver intended to receive PPM-PAM symbols from a plurality P of sources, comprising a filter matched to the transmission channel between the sources and the receiver and, if necessary, to the spatial-temporal coding used in the emission, characterised in that it moreover comprises a sphere decoder comprising means adapted to perform the steps of the sphere decoding method according to one of the previous claims, the sphere decoder receiving in input the output of said matched filter.

* * * * *